Nov. 20, 1934.  W. E. McCULLOUGH  1,981,276
PROCESS OF MAKING JOURNAL BEARINGS
Filed Nov. 14, 1932
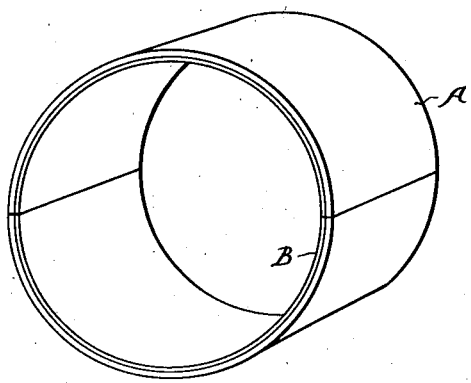
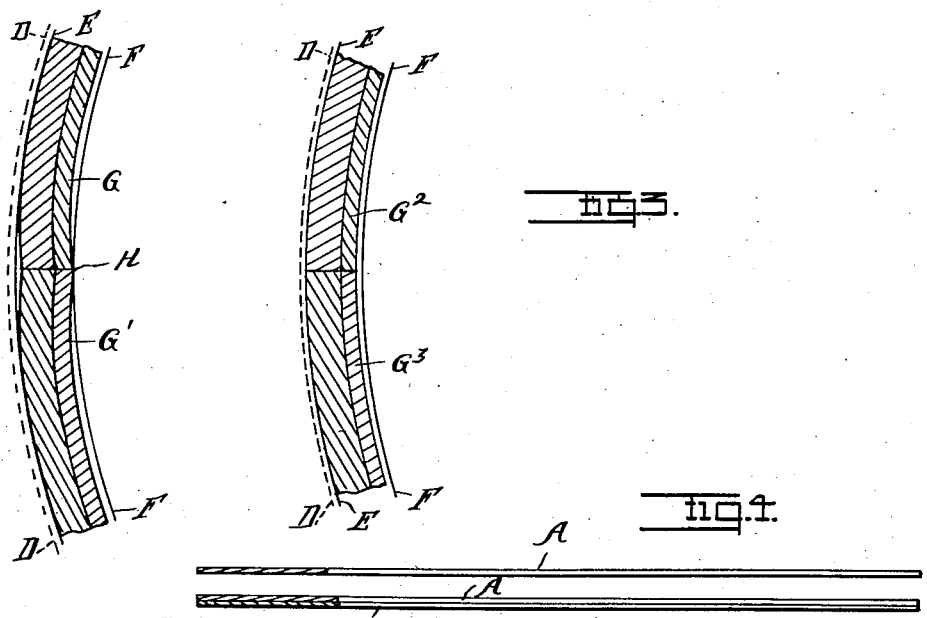
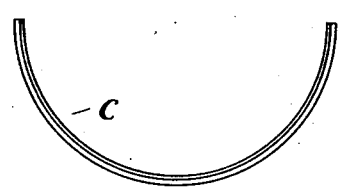
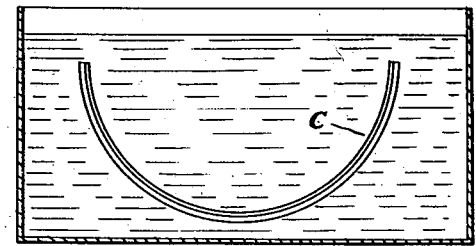

Patented Nov. 20, 1934

1,981,276

UNITED STATES PATENT OFFICE 1,981,276

PROCESS OF MAKING JOURNAL BEARINGS

William E. McCullough, Detroit, Mich., assignor to Bohn Aluminum & Brass Corporation, Detroit, Mich., a corporation of Michigan Application November 14, 1932, Serial No. 642,689

3 Claims. (Cl. 29—149.5)

The invention relates to the manufacture of journal bearings of that type comprising segmental bushings or liners formed of thin metallic shells with an inner facing of wearing materials such as babbitt. In the present state of the art it is customary in the use of bearings of this type to form the segmental shells slightly over size or of an outer radius slightly in excess of the holder or supporting bearing in which the shell is to be placed. Thus when the bearing is clamped the shell or bushing will be placed under compression thereby forcing its external surface into contact with the inner surface of the holder or supporting bearing so as to maintain high thermal conductivity. This is very important as the heat frictionally developed by the rotation of the shaft or journal must be dissipated to prevent over heating and burning out of the bearing.

In practical use there has been a certain percentage of failure with bearings of this type, the reason for which has not heretofore been understood. I have discovered the cause of this failure and also a remedy for the same. The invention therefore consists in the method of forming modified construction of bearing in which the defects in construction heretofore used have been corrected.

My improvements are particularly applicable to bearings in which the shells are formed of thin strips of cold rolled steel with an inner wearing face of babbitt. Heretofore such shells have been formed by first tinning one face of the strip; second, coating the tinned face with a layer of babbitt; third, cutting the strip into suitable lengths; fourth, pressing the strip to form the segmental shells. As previously stated, the outer radius of the pressed shell is in excess of that of the holder or outer bearing in which the shell is to be placed. As a specific example, a steel strip having a thickness of .05 before babbitting and .075 after babbitting is pressed to form a shell having an outer radius of 1.255 to be placed in a holder having a radius of 1.25. Thus when the segmental shells are placed in the outer bearing they will be slightly contracted and when subjected to clamping pressure will be forced into close contact with the inner face of the holder.

I have discovered that the failure in such bearings is due to the softness or lack of temper in the steel shell, which in turn is due to the annealing effect resulting from the tinning and babbitting operations. This softness or lack of temper produces two detrimental results. In the first place, there is a lack of resiliency so that when placed in the outer bearing there is insufficient resistance or outward pressure to hold the shell in firm contact therewith. Second, due to the softness of the metal there is a tendency for it to upset at the point of abutment of one semi-circular shell against the complementary semi-circular shell. Due to both of these effects, portions of the shell under clamping pressure are pinched inward so as to produce a localized contact with the journal which overheats and finally breaks the lubricant film therefrom. This results in the heating of the bearing and finally in the burning out of the same.

To cure the defects above given, the shells must have imparted thereto a greater hardness and higher degree of resiliency which is obtained as hereinafter described.

In the drawing:

Fig. 1 is a perspective view of my improved shell bearing;

Fig. 2 is an enlarged cross section through the meeting portions of the bearing shells illustrating the defect which my improved bearing eliminates;

Fig. 3 is a similar view of the improved bearing;

Figs. 4, 5, 6 and 7 are diagrams illustrating the successive steps in the forming of my improved shell bearing.

As illustrated, A is a cold rolled steel strip for forming the bearing shell and preferably having a carbon content from .06 to .12%, B is a babbitt facing for one side of said strip which is applied thereto in the usual manner by immersing the strip in a tinning bath and then casting the babbitt thereon. This treatment results in drawing the temper and softening the steel as previously described. The tinned and babbitted strip is then pressed into semi-cylindrical form as shown at C, Fig. 6, the radius of curvature being slightly in excess of that of the outer bearing or holder in which the shell is to be finally placed, such for instance as five thousandths increase in radius. After the shell has been thus formed it is still in a soft state and is lacking in resiliency. However, by subjecting it to an aging treatment its hardness and resiliency may be increased. This is preferably accomplished as illustrated in Fig. 7 by immersing the formed shell in boiling water and permitting it to remain in this condition for several hours. As the result of said treatment, physical tests will show a substantial increase both in hardness and resiliency.

In Fig. 2 I have illustrated on a greatly enlarged scale a bearing of the old type and the effect produced thereon by placing the abutting shells within an outer holder which is of slightly smaller radius. Thus as shown, the arc D—D represents the outer surface of a shell as originally pressed and the arc E—E the contracted bearing in which the shells are placed. The arc F—F represents the surface of the journal which is placed within the shell. As indicated the abutting portions G G' of the bearing instead of maintaining contact between the outer surfaces and the arc E—E are deflected inward and as a consequence are pressed against the journal surface F—F at the point H with sufficient force to reduce or break the intervening oil film. Consequently in operation such a bearing will over heat and is likely to burn out. Fig. 3 illustrates in the same manner my improved bearing and it will be noted that this, on account of the inherent resiliency holds the outer surface of the shell in the portions $G^2$, $G^3$ in contact with the arc E—E and the inner surface parallel to the arc F—F without any point of localized pressure.

I am aware that the quick aging of steel by immersing the same in boiling water to increase its hardness has been heretofore known. As far as I am aware, however, the applicability of this process to the manufacture of segmental babbitt lined steel shell bearings has not been known and for the reason that the defects in such bearings which this treatment remedies were not understood.

What I claim as my invention is:

1. The method of forming a bearing shell, which consists in tinning and babbitting a steel strip, cutting said strip to a suitable length, pressing such length to form an oversized segmental shell and heat treating to artificially age the shell subsequent to the babbitting operation.

2. The method of forming a bearing shell which consists in tinning and babbitting a steel strip, cutting said strip to a suitable length, pressing such length to form an oversized shell and immersing the same in boiling water for a plurality of hours subsequent to the babbitting to age the same.

3. The method of forming a bearing shell which consists in babbitting one face of a cold rolled steel strip, pressing said strip to form an over sized segmental shell and heat treating to age the shell subsequent to the babbitting operation.

WILLIAM E. McCULLOUGH.